(12) United States Patent
Monteiro et al.

(10) Patent No.: US 7,385,966 B2
(45) Date of Patent: Jun. 10, 2008

(54) METHOD FOR THE AUTOMATIC CONFIGURATION OF A IP TELEPHONY DEVICE AND/OR DATA, SYSTEM AND DEVICE IMPLEMENTING SAME

(75) Inventors: Arthur Monteiro, Beynes (FR); Richard Jousset, Saint Rémy l'Honoré (FR)

(73) Assignee: EADS Telecom, Montigny LeBreton Neux (FR)

( * ) Notice: Subject to any disclaimer, the term of this patent is extended or adjusted under 35 U.S.C. 154(b) by 600 days.

(21) Appl. No.: 10/531,331

(22) PCT Filed: Sep. 16, 2003

(86) PCT No.: PCT/FR03/02728

§ 371 (c)(1),
(2), (4) Date: Apr. 14, 2005

(87) PCT Pub. No.: WO2004/036830

PCT Pub. Date: Apr. 29, 2004

(65) Prior Publication Data

US 2006/0050681 A1 Mar. 9, 2006

(30) Foreign Application Priority Data

Oct. 14, 2002 (FR) .................................. 02 12760

(51) Int. Cl.
*H04L 12/66* (2006.01)
(52) U.S. Cl. ....................... 370/356; 370/401
(58) Field of Classification Search ................. 370/356
See application file for complete search history.

(56) References Cited

U.S. PATENT DOCUMENTS

| 6,223,218 B1 | 4/2001 | Iijima et al. |
| 6,687,245 B2 * | 2/2004 | Fangman et al. ........... 370/356 |
| 2002/0009078 A1 * | 1/2002 | Wilson et al. .............. 370/389 |

FOREIGN PATENT DOCUMENTS

| EP | 1 017 200 | 7/2000 |
| WO | WO 00 77983 | 12/2000 |

OTHER PUBLICATIONS

Schulzrinne H., "Dynamic Host Configuration Protocol", RFC 3361, IETF, Columbia University, Aug. 2002.
Blake et al., "An Architecture For Differentiated Services", RFC 2475, IETF, Dec. 1998.
Nichols et al., "Definition of the Differentiated Services Field", RFC 2474, IETF, Dec. 1998.
International Search Report dated Mar. 25, 2004, Appl. No. PCT/FR03/02728.

* cited by examiner

*Primary Examiner*—Creighton Smith
(74) *Attorney, Agent, or Firm*—McCracken & Frank LLP

(57) ABSTRACT

The invention relates to a method for the automatic configuration of an IP telephony device and/or data from a data transmission network with packet switching, which enables the device to obtain a lease on a virtual sub-network while it is physically connected to another virtual sub-network. In this way, for example, another device can share the same physical access port to the networks via a switch, without the two devices necessarily receiving a lease on the same sub-network.

25 Claims, 3 Drawing Sheets

METHOD FOR THE AUTOMATIC CONFIGURATION OF A IP TELEPHONY DEVICE AND/OR DATA, SYSTEM AND DEVICE IMPLEMENTING SAME

TECHNICAL FIELD

The present invention pertains to ToIP (standing for "Telephony over IP") technology, which relies on the use of existing IP ("Internet Protocol") networks and the shared utilization of telephony information streams (hereafter ToIP streams) and the information streams (hereafter data streams).

BACKGROUND OF THE INVENTION

In order to guarantee good quality communications, the network, and possibly the telephone sets (also called IP telephones) must manage the quality of service (QoS) that is to say the monitoring of the IP packet handling time, of the jitter (i.e. the variation in the packet handling time), and of the loss of packets. This management may be carried out either by implementing a specific protocol such as the DiffServ protocol ("Differentiated Services", RFC 2474 and RFC 2475) which acts at level 3 (network layer of the OSI reference model) by tagging the packets with a priority level, or by implementing a protocol such as the "VLAN Tagging" IEEE 802.1 Q/P standard of the IEEE which acts at level 2 (link layer of the OSI reference model) by tagging the frames with a virtual subnet identifier and a priority level.

Even if the existing devices of the network are compatible with the DiffServ protocol, the tagging of the frames according to the 802.1 Q/P standard is advantageous if the network, for example an Ethernet network (see the IEEE 802.3 standard, taken up at the ISO under the nomenclature ISO 8802.3) already exhibits a structure of virtual subnets, for example of VLAN type ("Virtual Local Area Network"), for the various computer applications. For example, the network can comprise a "data" VLAN for transporting the data streams, and a "telephony" VLAN for transporting the ToIP streams. In this case indeed, each terminal device of the network already tags its frames with a VLAN identifier by employing version 802.1 Q of the standard. It is then sufficient to employ version 802.1 Q/P of the standard in order for an IP telephone to tag its frames with a VLAN identifier and a priority level, this making it possible to guarantee good QoS.

According to the current version of IP (IPv4), in order to operate, a network device requires the following parameters which form what is called a lease and are the subject of a configuration procedure:

a unique address on the network (IP address);
a subnet mask which identifies the IP subnet to which the device belongs from among the whole set of interconnected IP networks; and
the address of the default router with which the device has to communicate ("DeFault Gateway" or DFG).

Other parameters are available for the specific requirements of applications. In total, there are 63 parameters. This is why the configuring of the devices performed manually during the installation of each of them is onerous, especially in respect of IP telephones which have only a telephone keypad for man/machine interface.

A requirement exists which consists in allowing an IP telephone to automatically receive its IP parameters from a configuration server such as a DHCP ("Dynamic Host Configuration Protocol", RFC 3361) server at each boot. The term boot is understood to mean physical and/or electrical connection of the device to the network. This in fact makes it possible to simplify the management of the network, in particular the mass deployment of telephone sets on the existing IP network but also their maintenance. Automatic configuration of the IP parameters in fact avoids the need to enter the IP information and the QoS information (i.e., the information specific to DiffServ or to 802.1 Q/P, for example) into the keypad of each telephone set, this information forming the parameters of the lease thereof. Accordingly, the DHCP client of the telephone set asks the DHCP server for these parameters directly with the aid of the "class identifier" field of a lease request. The DHCP server then sends it the parameters with the aid of the "Vendor Specific information" field of a lease offer.

A user's work environment generally comprises an IP telephone and a computing system such as a general-purpose computer (hereinafter PC, standing for "personal computer"). It is therefore necessary to manage the shared utilization of various protocols and standards which are implemented during the booting of the IP telephone or of the PC, namely DHCP, Relay DHCP, IEEE 802.1 Q/P and/or DiffServ, and IEEE 802.3. It is recalled that DHCP allows any IP system to dynamically receive its network configuration from a DHCP server. Relay DHCP, which corresponds to a chapter of DHCP, is a functionality which, when it is employed on IP routers, makes it possible to relay the requests sent by the DHCP clients to a DHCP server connected to a different network (remote network on different WAN or VLAN link). The IEEE 802.1 Q/P standard makes it possible to define virtual subnets and to assign them different processing priorities. DiffServ is a protocol for tagging the priority of an IP frame. Finally, the IEEE 802.3 standard defines the format of Ethernet frames.

When the IP telephone and the PC of one and the same workstation are connected to the IP network by two separate physical access ports, the processing of the protocols and standards is carried out in a completely distinct manner by the active devices of the network. An automatic configuration and QoS virtual subnet policy can therefore be implemented separately for the IP telephone and for the PC.

On the other hand, when using a switch to connect the two devices to the IP network across a single physical access port, the necessary differentiation between the two devices is no longer achievable with the basic functions of the protocols and standards implemented. Such a switch is for example an Ethernet switch having three ports. It is for example integrated within the IP telephone to make it possible to deploy telephony over IP without needing to modify the architecture of an existing network in order to add a physical access port dedicated to telephony for each workstation. Certain problems related to the sequencing of the operations during the booting of the IP telephone may then occur. These problems are related to the specific manner of operation of the DHCP protocol and of the IEEE 802.1 standard. As a result, the IP telephone and the PC receive a lease which is necessarily on the same VLAN. This signifies that the ToIP stream and the data stream are mixed, and are processed with the same priority.

It is therefore desirable to guarantee transparency of operation of the IP telephone which integrates a switch, vis-à-vis the PC which is connected thereto and which is likewise a DHCP client, during the booting of the IP telephone or of the PC, when these devices perform their lease request and when they receive configuration information.

A technology has been proposed by the constructor of Cisco network devices, which relies on the implementation of an additional protocol called CDP ("Cisco Discovery Protocol"). This protocol is entirely proprietary. It is found only on certain Ethernet switches, certain routers and on the IP telephones manufactured by Cisco.

During its booting, the IP telephone uses the CDP protocol to identify itself on the Cisco Ethernet switch. The latter recognizes this type of client and automatically places the subsequent Ethernet frames on the "telephony" VLAN whose number has previously been configured on each of the Ethernet switches of the network.

If a PC is connected to the same physical access port of the Ethernet network by way of said Ethernet switch, the switch automatically differentiates between the two devices based on the MAC ("Media Access Control") addresses of each of them. The Ethernet frames originating from the PC are directed onto the "data" VLAN, which is typically customized on the port of the switch which receives them, and the frames sent by the IP telephone are broadcast on the "telephony" VLAN. Thus, the whole set of ToIP streams of each IP telephone of the network is located dynamically on a separate VLAN to which the desired priority is applied.

This configuration procedure is admittedly entirely automatic, the priority and VLAN number parameters possibly being configured in a centralized manner by the network administration tool. Nevertheless, the solution is entirely based on a proprietary protocol available only on certain Ethernet switches and Cisco routers (only the most recent ones). In particular the procedure described above no longer operates if the network comprises devices other than those from Cisco.

Moreover, the whole set of IP telephones receives a lease which is necessarily on one and the same "telephony" VLAN. Now, in certain organizations or enterprises, several different "telephony" VLANs are necessary in order to respond to requirements regarding security or isolation of the various telephone subnets. BRIEF DESCRIPTION OF THE INVENTION Accordingly, a first aspect of the invention proposes a method for the automatic configuration of a determined device of a packet switching data transmission network on which are defined at least one first virtual subnet for network devices of a first type and at least one second virtual subnet for network devices of a second type. The device is physically connected to any one of said first and second virtual subnets. It belongs to any one of said first and second types. The method comprises the steps according to which the device performs the steps of:

broadcasting over the virtual subnet to which it is physically connected, a first lease request comprising an identifier of the type to which it belongs;

receiving, in response to said first lease request, a first lease containing an address on the virtual subnet to which it is physically connected, an identifier of the virtual subnet of the devices of the type to which it belongs, and, if it does not belong to the type of the devices of the virtual subnet to which it is connected, a cue for activating tagging of the frames with said virtual subnet identifier;

if said first lease contains said tagging activation cue:

releasing said first lease;

broadcast mode broadcasting over the virtual subnet of the devices of the type to which it belongs, a second lease request tagged with said identifier of the virtual subnet of the devices of the type to which it belongs; and receiving, in response to said second lease request, a second lease containing an address on the virtual subnet of the devices of the type to which it belongs;

otherwise retaining said first lease.

A second aspect of the invention relates to a system comprising a packet switching data transmission network on which are defined at least one first virtual subnet for network devices of a first type and at least one second virtual subnet for network devices of a second type. The system furthermore comprises a determined device which is physically connected to any one of said first and second virtual subnets. The device belongs to any one of said first and second types. The device is adapted for implementing a method according to the first aspect.

A third aspect of the invention pertains to a device of a packet switching data transmission network on which are defined at least one first virtual subnet for network devices of a first type and at least one second virtual subnet for network devices of a second type. The device belongs to any one of said first and second types. It comprises means for executing a method according to the first aspect.

The concepts of virtual type of devices and of subnets of the devices of a determined type are nonlimiting. They imply a set of devices that the network administrator may wish to group together on one and the same virtual subnet according to a determined criterion or a combination of determined criteria. For example, a criterion may pertain to the nature of the devices (in particular, the terminal devices or the system devices, respectively for telephony or for data, may be grouped together on distinct virtual subnets). Another criterion may be geographical (all the devices situated in a determined building or a determined local area may be grouped together on one and the same virtual subnet). Another criterion still may be functional (the terminal devices of a group of identified users may be grouped together on one and the same virtual subnet, independently of their geographical position), etc.

The main network is for example a local area network (LAN) with an Ethernet network as backbone. The virtual subnets are for example VLANs. The virtual subnets are for example defined and managed according to the IEEE 802.1 Q/P standard. According to this standard, the first lease proposal furthermore contains a priority number associated with the device. In this case, the second lease request advantageously contains this priority number.

The devices of the first and/or of the second type are for example terminal devices. The devices of the first type are for example PCs, and the devices of the second type are for example IP telephones. Nevertheless the invention may also be implemented on network devices such as ToIP gateways or the like.

The configuration server is for example a DHCP server, that is to say it employs the DHCP configuration protocol. The implementation of the invention is compatible with network architectures serviced by one or more configuration servers.

The first lease request is processed by a first configuration server which is or is not physically connected to the virtual subnet to which the device is physically connected. If it is not, the first lease request in broadcast mode is relayed in uni-recipient mode ("unicast") to said first configuration server via one or more appropriate routers, such as routers employing the Relay DHCP protocol in the example.

Likewise, the second lease request is processed by said first configuration server or a second configuration server which is or is not physically connected to the devices virtual subnet to which the device belongs. If not, the second lease request in broadcast mode is relayed in uni-recipient mode to said first or second configuration server via one or more appropriate routers.

If it is the same configuration server (i.e., said first configuration server) which services the first and second virtual subnets and processes the first and second lease requests, this configuration server manages a first and a second address range ("scope") respectively on the first and on the second virtual subnets. In a general manner, it manages an address range for each virtual subnet which it services. Thus, if it is moreover the only configuration server of the network, it manages an address range for each virtual subnet of the network.

The invention is thus advantageously based on the use of normal protocols and standards: IEEE 802.3, IEEE 802.1 Q/P, DHCP and Relay DHCP. It is therefore completely independent of the existing devices on the network.

Each device is configured entirely, and in an entirely dynamic manner, in accordance with the particulars provided by the configuration server (or servers). No additional intervention by the network administrator is required to configure the QoS. The deployment and especially the maintenance of large telephone over IP networks are therefore easier.

The network administrator can establish as many virtual subnets of each type as necessary, by customizing the configuration server(s) alone. Moreover, the modification of the virtual subnets is easy, by modifying the customization of the configuration server(s) without having to intervene on the terminal devices linked to the main network.

The first device and the second device may operate simultaneously as client of the configuration protocol. Despite being connected to the main network by the same physical access port, they receive configuration leases on different virtual subnets and are thus attached to different virtual subnets. Each type of device's own QoS is thus guaranteed.

The use of the existing cabling with a single physical access port, i.e., a single network socket, per user (by virtue of a switch integrated within one of the devices) is thus made possible by separating each type of device's own information streams on distinct virtual subnets, each of which is dynamically configurable.

The implementation of the invention greatly facilitates the mass installation and the maintenance of IP telephones on network infrastructures such as large Ethernet backbones, of the type of those deployed on university campuses or company sites.

Moreover, devices other than terminal devices, such as for example ToIP gateways or the like of the network, may benefit therefrom. The advantages of the invention are, for them, less than for terminal devices since these devices do not integrate any Ethernet switch allowing them to be strung together in a chain with computing devices.

DESCRIPTION OF PREFERRED EMBODIMENTS

Figure 1:
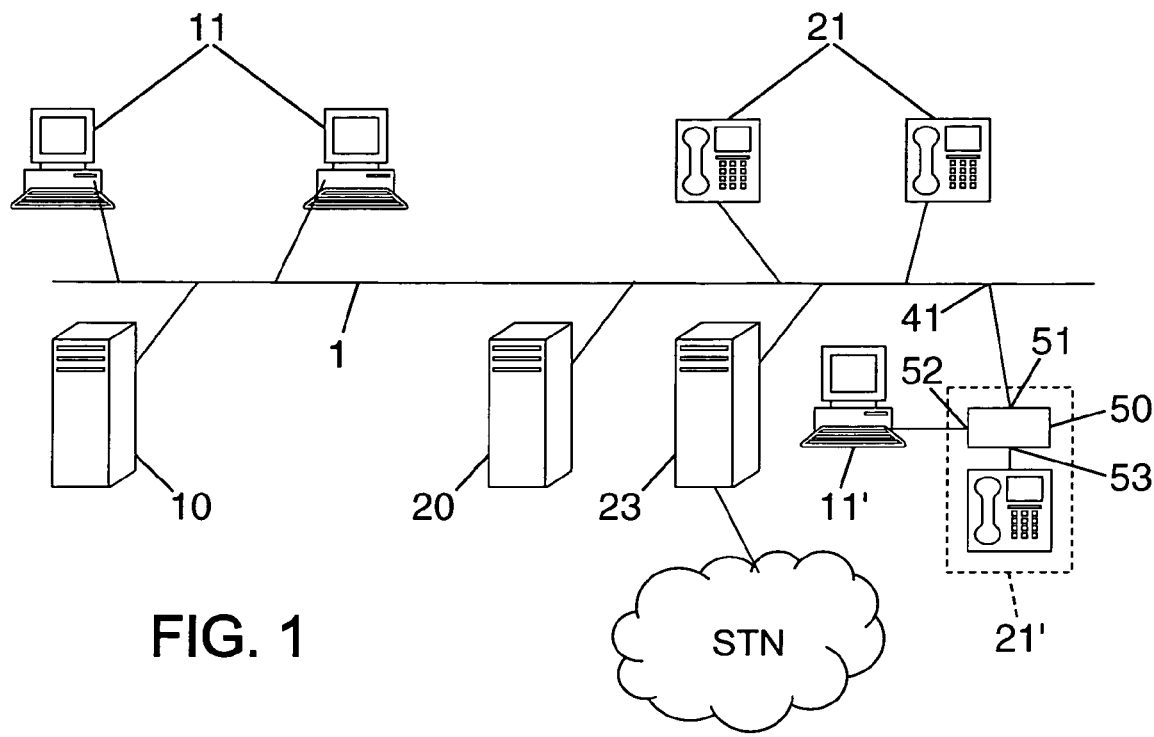
FIG. 1 is a diagram of an exemplary packet switching data transmission system.

In FIG. 1 is represented diagrammatically an exemplary computing system based on a packet switching data transmission network, in particular an IP network of LAN type.

The network comprises for example, as backbone 1, an Ethernet network comprising one or more Ethernet switches. Network devices are connected to the backbone 1. These devices comprise terminal devices and system devices.

The terminal devices comprise PCs designated under the general reference 11 and telephone sets (IP telephones) designated under the general reference 21. The telephone sets 21 may be dedicated sets or telephone sets emulated on a computer (called "soft-phone" in the jargon of the person skilled in the art).

In principle, each terminal device is physically connected to the IP network by way of a respective physical access port. This physical access port may then be assigned to a virtual subnet of the devices of the type of the terminal device considered. However, when a telephony over IP service is deployed on an existing IP network, it happens that the cabling of the network is such that a single physical port for access to the network is available for each user workstation. It is then possible to incorporate an Ethernet switch into the telephone sets 21 in such a way as to allow the connection, for example, of a PC and of a telephone set up to said physical port for access to the network. This avoids the need to modify the network cabling.

Thus, in the example represented, a physical access port 41 is shared by a PC 11' and a telephone set 21'. In the example, the telephone set 21' comprises a switch 50 with three communication ports, namely an output port 51, and two input ports 52 and 53. The port 51 is linked to the physical access port 41 of the network. The port 52 is linked to the PC 11' to receive the "data" stream originating from this PC and the port 53 receives the ToIP stream from the telephone set 21'.

Of course, the switch can also lie within the PC 11', or be external to the PC 11' and to the telephone set 21'.

The system devices comprise a network server 10 which manages the "data" applications of the network, a call server 20 which manages the "telephony" applications of the network, as well as possibly a ToIP gateway 23 providing for the interface of the Ethernet network with the switched telephone network 24 (STN). The call server 20 dynamically establishes the match between the call numbers of the telephone sets and their respective IP addresses.

To allow effective management of the QoS for telephony, in particular, it is possible to define several virtual networks of VLAN type according to the IEEE 802.1 Q/P standard.

Moreover, automatic configuration of each terminal device during the booting thereof is possible by employing a dynamic configuration protocol such as DHCP on the network.

Figure 2:
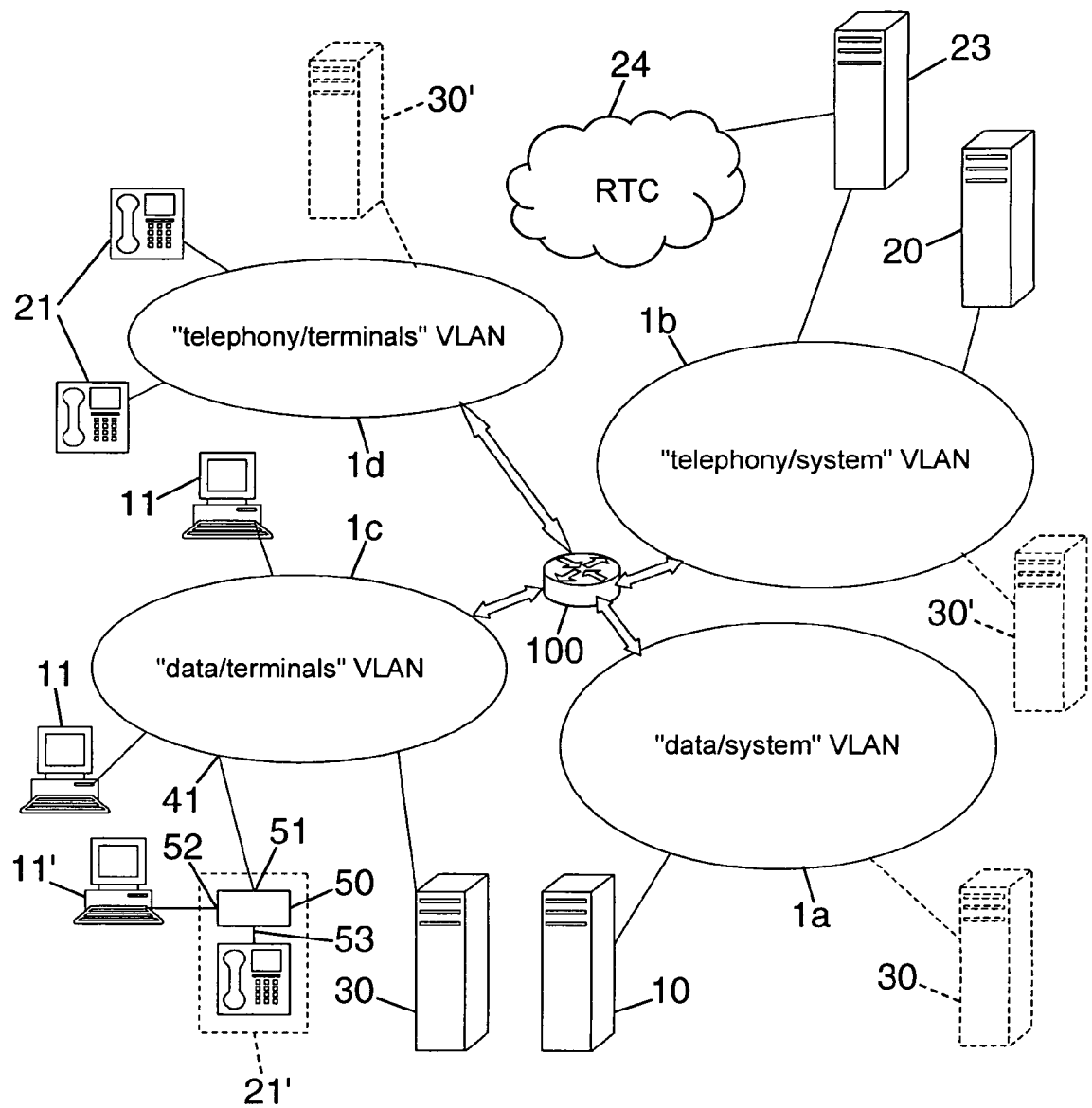
FIG. 2 is a diagram illustrating exemplary network topologies with virtual subnets of a system according to FIG. 1.

These various characteristics are illustrated by the diagram of FIG. 2 in which the same elements as in FIG. 1 bear the same references.

In the example of FIG. 2, the network 1 of FIG. 1 is divided into four virtual subnets 1*a* to 1*d*. These virtual subnets are of VLAN type, and the transmission of data between them is managed by a router 100. One thus distinguishes:

a "data/system" VLAN 1a for the system devices which manage the "data" applications, and to which the network server 10 is connected;

a "telephony/system" VLAN 1b for the system devices which manage the "telephony" applications, and to which the call server 20 and the router 23 are connected;

a "data/terminals" VLAN 1c, for the terminal equipment of "data" type, and to which the PCs are connected; and, a "telephony/terminals" VLAN 1d, for the terminal devices of "data" type, and to which the telephone sets 21 are connected.

This example adopts therefore, for the definition of the virtual subnets, a criterion pertaining to the nature of the network devices. It will however be noted that, for example by reason of a constraint related to the cabling, the communication port 41 to which the telephone set 21' is physically connected (via the switch 50) belongs to the virtual subnet 1c. It is recalled that the PC 111 is also physically connected, via the switch 50, to the communication port 41 which is assigned to the virtual subnet 1c.

Furthermore, at least one configuration server 30, such as a DHCP server, is linked to the network. The function of the configuration server 30 is to dynamically distribute the configurations of the devices, in particular the terminal devices, during their booting.

In a first example, corresponding to the case of FIG. 2, the server 30 is the only configuration server of the network and is physically connected to the virtual subnet 1c. In a second example, the server 30 is the only configuration server of the network, and is physically connected to another virtual subnet, for example the virtual subnet 1a. In a third example, the network comprises a second configuration server 30' which is physically connected to the VLAN 1d, in addition to the server 30. Finally, in a fourth example, the second configuration server 30' is physically connected to the VLAN 1b. The connection of the servers 30 and 30' according to these second, third and fourth examples is illustrated in FIG. 2 by broken lines.

In the case of a network topology such as that represented in FIG. 2, if no precaution is taken, the implementation of the DHCP protocol during the booting of the telephone set 21' will result in the latter receiving from the server 30 a lease (in particular an IP address) on the virtual subnet 1c. At best, the ToIP stream of this telephone set 21' will be mixed with the data stream of the PCs 11 and 11', this being very bad in terms of quality of service QoS. At worst, the telephone set 21' has no access to the call server 20. It may therefore not register itself with the server, so it will remain inactive. This is why the telephone set 21' should receive a lease on the subnet 1d of the telephone terminals.

Figure 4:
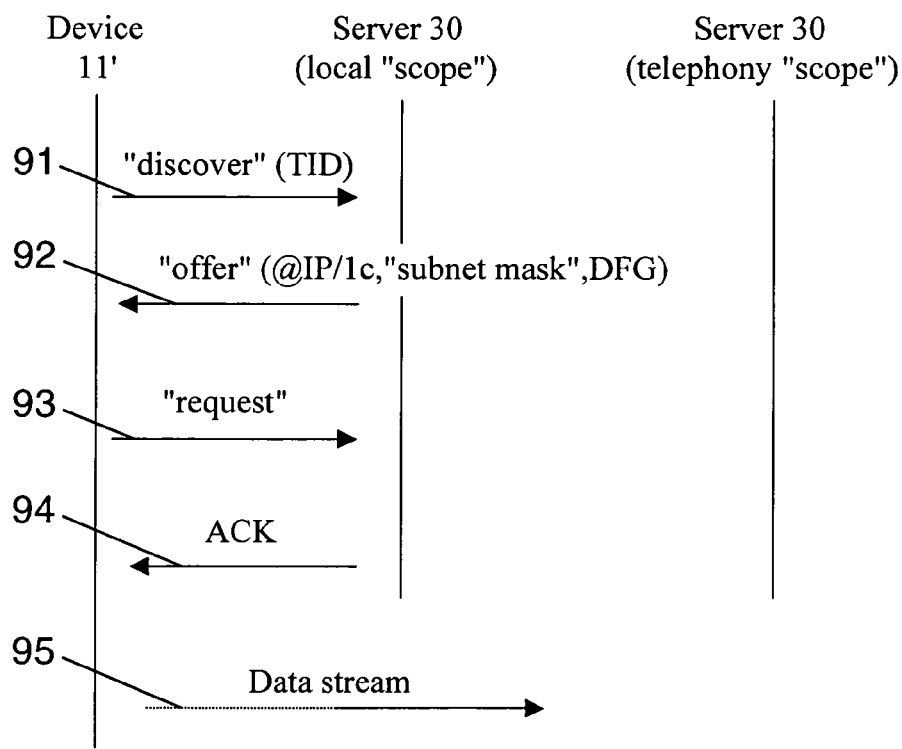
FIG. 4 is a timechart of exchanges of messages of an exemplary implementation of the method according to the invention in a second case.
Figure 3:
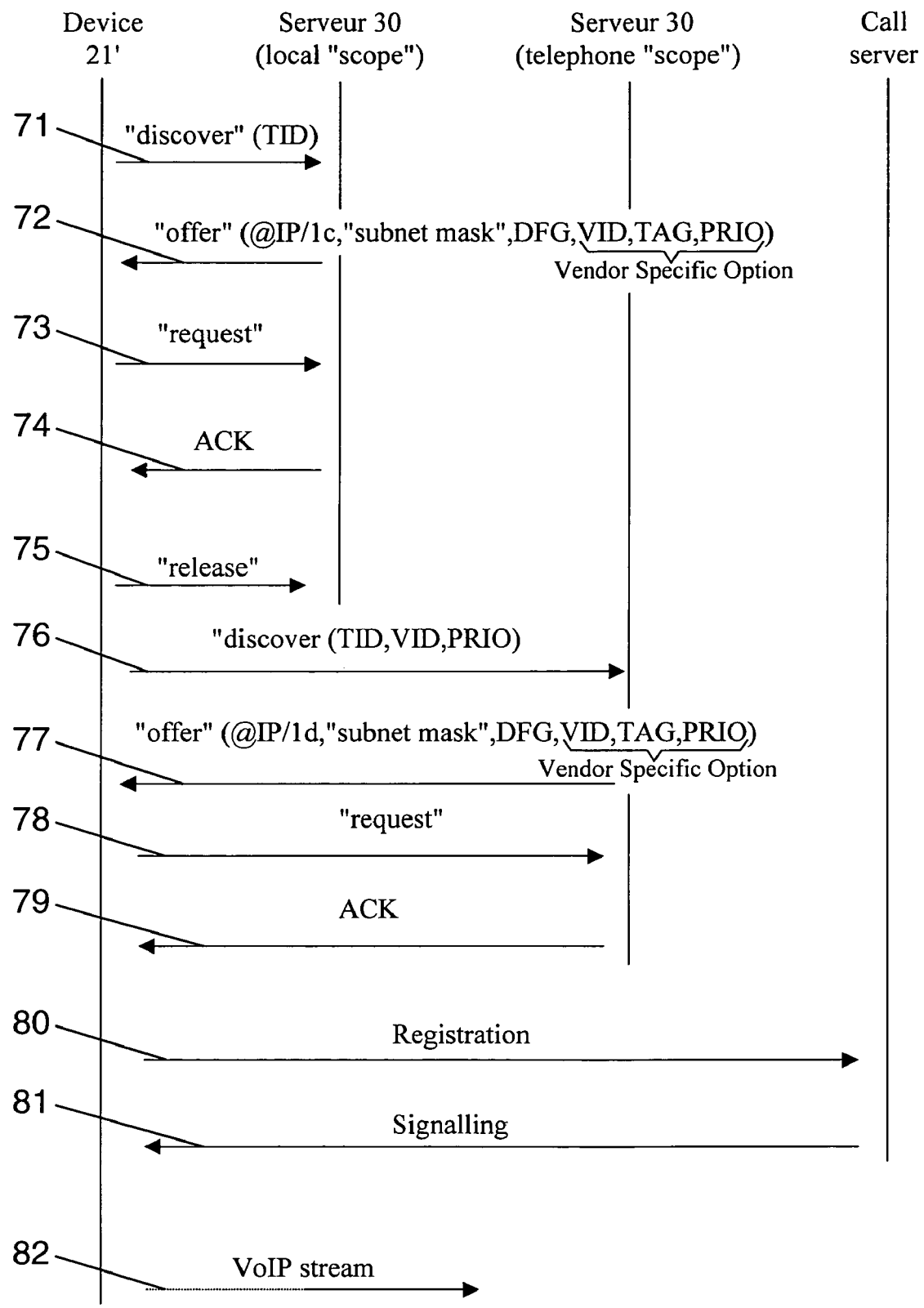
FIG. 3 is a timechart of exchanges of messages of an exemplary implementation of the method according to the invention in a first case.

The message exchange timecharts of FIG. 3 and of FIG. 4 illustrate an exemplary implementation of the method, during the booting of the telephone set 21' and of the PC 11' respectively.

In the case of FIGS. 3 and 4 we consider the first aforesaid example according to which the configuration server 30 is physically connected to the subnet 1c, and according to which it is furthermore the only configuration server of the network. In this case, it manages a first address range on the subnet 1c and a second address range on each of the other subnets, in particular on the VLAN 1d. Moreover, the router 100 employs the Relay DHCP protocol to relay to the server 30 the DHCP requests sent in broadcast mode on the other subnets, in particular on the VLAN 1d.

Let us firstly look at the case illustrated in FIG. 3, which corresponds to the bringing of the device 21' into service. It is recalled that this device does not belong to the type of devices of the VLAN to which it is physically connected. Specifically, it is a telephone set physically connected to the communication port 41 which is assigned to the "data/terminals" VLAN 1c.

In a step 71 the device 21' sends a first lease request. At this juncture, the device 21' knows neither its IP address nor the IP address of the DHCP server which services the VLAN 1c. This request is therefore sent in broadcast mode according to the IEEE 802.3 standard, inside the VLAN 1c to which the device 21' is physically connected in the guise of DHCP client. In the example, one is dealing with a DHCP message called "discover". It is supplemented, in a "Class identifier" field, with a TID identifier ("Terminal IDentifier") of the device type to which the device 21' belongs, that is to say an identifier specific to the telephone sets of the network. This request is received and processed by the configuration server 30 which is connected to the VLAN 1c.

In a step 72, the configuration server 30 despatches a first lease offer to the telephone set, in response to the first lease request. This is a DHCP message called "offer". This message is sent according to the IEEE 802.3 standard. The lease proposed contains the conventional parameters, namely: an IP address (denoted @IP/1c on the next line) on the virtual subnet 1c, a subnet mask, and the address of the default router (DFG). The IP address is an address of the address range of the VLAN 1c, which is managed by the server 30.

Furthermore, when the IEEE 801.1 Q/P standard is implemented, a "Vendor Specific Option" field of the lease also contains a VID identifier ("Vlan IDentifier") of the VLAN 1d, that is to say of the VLAN of the devices of the type to which it belongs. This VID identifier is a 12-bit field which indicates the IP address of the VLAN.

Moreover, as the device 21' does not belong to the type of the devices of the VLAN 1c to which it is physically connected, the lease furthermore contains, also in the aforesaid "Vendor Specific Option" field, a cue for activating tagging of the frames. This cue comprises a determined bit TAG which is for example set to the value 1 in this case. This cue signifies that the device 21' must tag its frames with the identifier of the VLAN 1d.

The first lease furthermore contains, still in the "Vendor Specific Option" field, a priority number PRIO associated with the device. This number is coded in a three-bit field. It follows that eight priority levels can be defined, thereby making it possible to favor certain applications relative to others.

According to the DHCP protocol, the device 21' then despatches, in a step 73, a DHCP message called "request" to accept the lease. Thereafter, the server 30 despatches thereto, in a step 74, a DHCP message called "ACK" to confirm the allocation of the lease. These two messages are sent according to the IEEE 803.2 standard.

For simplicity, steps 72 to 74 may be summarized by saying that the device 21' receives the first lease as described hereinabove.

When the frame tagging activation cue is present (i.e., when the bit TAG is set to 1), the device 21' releases the first lease by despatching, in a step 75, a DHCP message called "release". This message is despatched according to the IEEE 802.3 standard.

In a step 76, the device subsequently despatches a second lease request. At this juncture, the device 21' knows the IP address of the VLAN 1d of the devices of the type to which it belongs, but it does not know the address of the DHCP server which services this VLAN. This is why the second lease request is sent in broadcast mode inside the VLAN 1d. It is sent according to the IEEE 802.1 Q standard, that is to say it is tagged with the VID identifier of the VLAN 1d. If the first lease offer contained a priority number, the second lease request is sent according to the IEEE 802.1 Q/P standard, that is to say it is furthermore tagged with the priority number PRIO. In the example, the second lease request is also a "discover" message. This message is also supplemented, in the "class identifier" field, with the identifier of the device type to which the device 21' belongs. This request is received and processed by the configuration server 30 which is connected to the VLAN 1c.

In a step 77, the server 30 despatches to the device 21', in response to the second lease request, a second lease proposal containing an IP address on the VLAN 1d, that is to say the virtual subnet of the devices of the type to which the device belongs. This address is denoted "@IP/1c" in the figure. This is an "offer" message sent according to the IEEE 802.3 standard. It furthermore contains the same cues as the first lease offer sent in step 72.

In a step 78, the device 21' accepts the second lease proposal by despatching a "request" message while using the tagging of the IEEE 802.1 Q/P standard. Thereafter, the server 30 despatches thereto, in a step 79, an "ACK" message to confirm the allocation of the second lease. This latter message is sent according to the IEEE 802.3 standard.

For simplicity, steps 77 to 79 may be summarized by saying that the device 21' receives the second lease as described hereinabove.

In a step 80, the device 21' thereafter despatches a message in uni-recipient mode to the call server 20 so as to register itself on this server. This message is sent according to the IEEE 802.1 Q/P standard, that is to say it is tagged with the identifier of the VLAN 1d, and, as appropriate, with the priority number assigned to the device 21'.

In return, the call server 20 despatches to the device 21', in a step 81, some signalling in uni-recipient mode, according to the IEEE 802.1 Q/P standard, that is to say tagged with the number of the VLAN 1d.

In a step 82, the device 21' begins to despatch telephony information (ToIP stream) to other telephone sets 21, or to the STN via the ToIP gateway 23. The packets of this ToIP stream are in accordance with the IEEE 802.1 Q/P standard, that is to say they are tagged with the identifier of the VLAN 1d, with the priority number assigned to the device 21'.

Let us now turn to the case illustrated in FIG. 4, of the bringing into service of the device 11'. In contradistinction to the device 21, this device belongs to the type of the devices of the VLAN to which it is physically connected.

Steps 91 to 94 are identical to steps 71 to 74 respectively which were described above relating to the device 21'. In this case, however, the message of the response 92 does not contain the cues of the "Vendor Specific Option" field.

This is why the device 11' retains the first lease received in step 92 with the first lease proposal. In a step 95, the device 11' begins to despatch "data" cues (data stream) to other PCs 11, or to the network server 10. The packets of this data stream comply with the IEEE 802.3 standard, that is to say they are not tagged.

The switch 50 must therefore be capable of receiving tagged packets (those of the ToIP stream originating from the device 21') and untagged packets (those of the data stream originating from the device 11'). Since not all Ethernet switches on the market satisfy this condition, a compatible switch should be chosen. The same constraint applies to the Ethernet switch of the network 1 to which the switch 50 is connected.

Let us now consider the case of the second example envisaged above, according to which the server 30 is the only configuration server of the network, and is physically connected to a virtual subnet other than the VLAN 1c, in particular to the virtual subnet 1a in the example. In this case, the first lease request despatched in step 71 or in step 91 and the second lease request despatched in step 76 are relayed to the server 30' by the router 100. For this purpose, the router 100 employs the Relay DHCP protocol.

Let us now consider the case of the third example envisaged above, according to which the network comprises a second configuration server 30' which is physically connected to the VLAN 1d, in addition to the server 30 which is physically connected to the VLAN 1c. In this case, the exchange of messages of steps 76 to 79 takes place between the device 21' and the server 30' instead of the server 30, since the server 30 has no address range for telephony, this address range being managed by the server 30'.

Let us now consider the case of the fourth example envisaged above, according to which the network comprises a second configuration server 30' which is physically connected to the VLAN 1a, in addition to the server 30 which is physically connected to the VLAN 1c. In this case, on the one hand, the second lease request despatched in step 76 is relayed to the server 30', by the router 100 which employs the Relay DHCP protocol for this purpose. And on the other hand, the exchange of messages of steps 76 to 79 takes place between the device 21' and the server 30' instead of the server 30. The server 30 does not need, in this example either, to manage an address range for telephony, since this address range is managed by the server 30'.

The invention claimed is:

1. A method for the automatic configuration of a determined device of a packet switching data transmission network on which are defined at least one first virtual subnet for network devices of a first type and at least one second virtual subnet for network devices of a second type, said determined device being physically connected to any one of said first and second virtual subnets and belonging to any one of said first and second types, the method comprising the steps wherein the device performs the steps of:
  broadcasting over the virtual subnet to which it is physically connected, a first lease request comprising an identifier of the type to which it belongs;
  receiving, in response to said first lease request, a first lease containing an address on the virtual subnet to which it is physically connected, an identifier of the virtual subnet of the devices of the type to which it belongs, and, if it does not belong to the type of the devices of the virtual subnet to which it is connected, a cue for activating tagging of the frames with said identifier;
  if said first lease contains said tagging activation cue:
  releasing said first lease;
  broadcasting over the virtual subnet of the devices of the type to which it belongs, a second lease request tagged with said identifier of the virtual subnet of the devices of the type to which it belongs; and
  receiving, in response to said second lease request, a second lease containing an address on the virtual subnet of the devices of the type to which it belongs;
  otherwise retaining said first lease.

2. The method of claim 1, wherein the first lease further contains a priority number associated with the device, and wherein said second lease request contains said priority number.

3. The method as claimed in claim 1, wherein the first lease request in broadcast mode is relayed in uni-recipient mode, via at least one appropriate router, to a first configuration server which is not physically connected to the virtual subnet to which the device is physically connected.

4. The method of claim 1, wherein the second lease request in broadcast mode is relayed in uni-recipient mode, via at least one appropriate router, to the first configuration server or to a second configuration server which is not physically connected, respectively which are not connected to the virtual subnet of the devices of the type to which the device belongs.

5. The method of claim 1, wherein the first lease request and the second lease request are processed by one and the same configuration server which manages a first address range on the first virtual subnet and a second address range on the second virtual subnet.

6. The method of claim 1, wherein the data transmission network is an Ethernet network defined by the IEEE 802.3 standard.

7. The method of claim 1, wherein the virtual subnets are defined by the IEEE 802.1 Q/P standard.

8. The method of claim 1, wherein the devices of the first type and/or the devices of the second type are terminal devices.

9. The method of claim 8, wherein the devices of the first type comprise general-purpose computers, and/or wherein the devices of the second type comprise telephone sets.

10. The method of claim 1, wherein the device comprises a switch having an output communication port for the physical link to the network and at least two input communication ports, one of which is adapted for receiving/sending a packet stream from/to the device, and the other of which is adapted for receiving/sending a packet stream from/to a device of the second type if the device is of the first type or from/to a device of the first type if the device is of the second type.

11. The method of claim 3, wherein the configuration server or servers employ the DHCP configuration protocol.

12. A system comprising a packet switching data transmission network on which are defined at least one first virtual subnet for network devices of a first type and at least one second virtual subnet for network devices of a second type, further comprising a device which is physically connected to any one of said first and second virtual subnets and which belongs to any one of said first and second types, wherein said device configured for:

broadcasting over the virtual subnet to which it is physically connected, a first lease request comprising an identifier of the type to which it belongs;

receiving, in response to said first lease request, a first lease containing an address on the virtual subnet to which it is physically connected, an identifier of the virtual subnet of the devices of the type to which it belongs, and, if it does not belong to the type of the devices of the virtual subnet to which it is connected, a cue for activating tagging of the frames with said identifier;

if said first lease contains said tagging activation cue;
releasing said first lease;
broadcasting over the virtual subnet of the devices of the type to which it belongs, a second lease request tagged with said identifier of the virtual subnet of the devices of the type to which it belongs; and receiving, in response to said second lease request, a second lease containing an address on the virtual subnet of the devices of the type to which it belongs;

otherwise retaining said first lease.

13. The system of claim 12, wherein the first lease further contains a priority number (PRIO) associated with the device, and wherein said second lease request contains said priority number.

14. The system of claim 12, further comprising at least one router for relaying, in uni-recipient mode, the first lease request to a first configuration server of the system, which is not physically connected to the virtual subnet to which the device is physically connected.

15. The system of claim 12, further comprising a router adapted for relaying, in uni-recipient mode, the second lease request to the first configuration server or to a second configuration server of the system which is not physically connected, respectively which are not connected to the virtual subnet of the devices of the type to which the device belongs.

16. The system of claim 12, further comprising, for processing the first lease request and the second lease request, one and the same configuration server which manages a first address range on the first virtual subnet and a second address range on the second virtual subnet.

17. The system of claim 12, wherein the data transmission network is an Ethernet network defined by the IEEE 802.3 standard.

18. The system of claim 12, wherein the virtual subnets are defined by the IEEE 802.1 Q/P standard.

19. The system of claim 12, wherein the devices of the first type and/or the devices of the second type are terminal devices.

20. The system of claim 19, wherein the devices of the first type comprise general-purpose computers, and/or wherein the devices of the second type comprise telephone sets.

21. The system of claim 12, wherein the device comprises a switch having an output communication port for the physical link to the network and at least two input communication ports, one of which is adapted for sending/receiving a packet stream from/to the device, and the other of which is adapted for sending/receiving a packet stream from/to a device of the second type if the device is of the first type or from/to a device of the first type if the device is of the second type.

22. The system of claim 12, wherein the configuration server or servers employ the DHCP configuration protocol.

23. A device of a packet switching data transmission network on which are defined at least one first virtual subnet for network devices of a first type and at least one second virtual subnet for network devices of a second type, the device belonging to any one of said first and second types and comprising means for:

broadcasting over the virtual subnet to which it is physically connected, a first lease request comprising an identifier of the type to which it belongs;

receiving, in response to said first lease request, a first lease containing an address on the virtual subnet to which it is physically connected, an identifier of the virtual subnet of the devices of the type to which it belongs, and, if it does not belong to the type of the devices of the virtual subnet to which it is connected, a cue for activating tagging of the frames with said identifier;

if said first lease contains said tagging activation cue; releasing said first lease;

broadcasting over the virtual subnet of the devices of the type to which it belongs, a second lease request tagged with said identifier of the virtual subnet of the devices of the type to which it belongs; and receiving, in response to said second lease request, a second lease containing an address on the virtual subnet of the devices of the type to which it belongs; otherwise retaining said first lease.

24. The device of claim 23, comprising a switch having an output communication port for the physical link to the network and at least two input communication ports, one of which is adapted for receiving/sending a packet stream from/to the device, and the other of which is adapted for receiving/sending a packet stream from/to a device of the second type if the device is of the first type or from a device of the first type if the device is of the second type.

25. The device of claim 23, wherein the first lease further contains a priority number associated with the device, and wherein said second lease request contains said priority number.

* * * * *